March 21, 1933. D. F. WARNER 1,902,792
PACKING
Filed March 23, 1932

Inventor:
Donald F. Warner,
by
His Attorney.

Patented Mar. 21, 1933

1,902,792

UNITED STATES PATENT OFFICE

DONALD F. WARNER, OF LYNN, MASSACHUSETTS, ASSIGNOR TO GENERAL ELECTRIC COMPANY, A CORPORATION OF NEW YORK

PACKING

Application filed March 23, 1932. Serial No. 600,741.

The present invention relates to packings for shafts and like rotary members, more particularly to the kind of packings in which a shaft or like rotary member projects through a casing which has a plurality of partitions defining recesses or cells and containing packing rings comprising a plurality of segments which are held in archbound relation floating on the shaft by spring means provided in the cells. The packing segments must be free to float in the cells and for this reason it is necessary to provide for side clearance. These clearances, however, in many cases permit leakage of fluid along the partitions and the outer casing, particularly when no natural axial thrust or side thrust causes the segments to hug one of the partitions. This is particularly true with respect to the packing rings provided between the end of the packing casing which communicates with the atmosphere and a drain arranged with respect to an intermediate cell.

The object of my invention is to provide an improved packing of the type above specified by which the above-named drawback is overcome.

For a consideration of what I believe to be novel and my invention, attention is directed to the following description and the claims appended thereto in connection with the accompanying drawing which forms a part of my specification.

Figure 1:
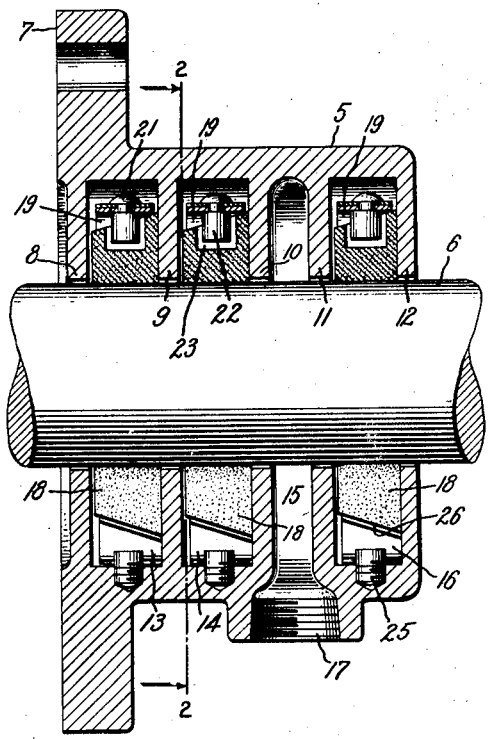
Figure 2:
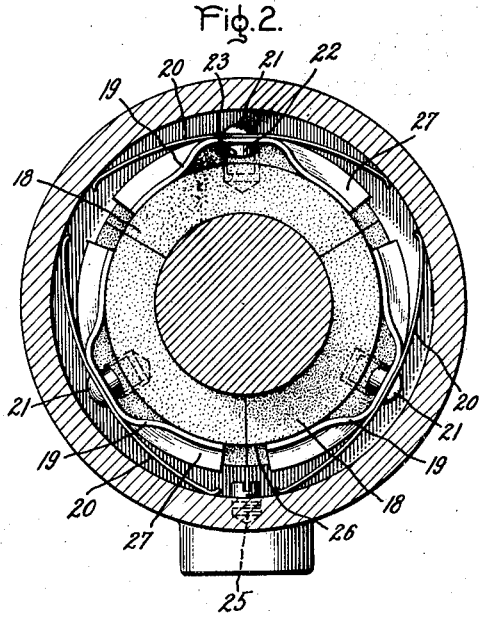
Figure 3:
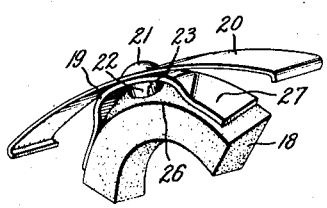

In the drawing, Fig. 1 represents by way of example a packing embodying my invention; Fig. 2 is a cross section along line 2—2 of Fig. 1, and Fig. 3 is a perspective view of a part of Fig. 1.

Referring to the drawing, 5 designates a casing through which a shaft 6 projects. Casing 5 may be integrally formed with the main casing of an elastic fluid engine or fastened thereto by providing a flange 7. The casing has been shown as being provided with inwardly projecting partitions or walls 8, 9, 10, 11 and 12 which define cells 13, 14, 15 and 16. One of these cells near the end of the casing which communicates with the atmosphere, in the present instance cell 15, is provided with a drain 17 communicating with the atmosphere. Each of cells 13, 14 and 16 contains a packing ring comprising a plurality of segments 18. In the present instance I have shown three segments for each packing ring. The segments are maintained in archbound relation floating on the shaft by spring means, in the present example shown as comprising a saddle member 19, and a leaf spring 20 for each segment. The saddle member and the leaf spring are fastened together by pins 21 which have projections 22 extending into holes 23 of the segments for maintaining the spring means in proper engagement with the segments. For preventing rotation of the packing I provide means, in the present instance shown as a pin, indicated at 25.

The arrangement so far described may be considered as typical of any packing of this kind. In case such a packing is provided at the high pressure end of an elastic fluid engine the pressure difference between this end and the atmosphere causes a side thrust for each packing ring provided in cells 13 and 14 whereby these rings hug the partitions 9 and 10 respectively. No such action, however, takes place with respect to the packing ring provided in cell 16, as both ends of this cell communicate with the atmosphere. Leakage occurring along the shaft through cells 13 and 14 would not be completely discharged through drain 17 but may partly leak along the partitions defining cell 16. In other cases where the packing is provided near the low pressure end, which may be a little below or above atmosphere, considerable leakage may occur not only through cell 16 but also through cells 13 and 14, as in such cases the small pressure difference is not sufficient to cause the necessary side thrust for the packing rings in cells 13 and 14.

According to my invention I provide means for causing an artificial side thrust on all the packing rings or at least one of the packing rings provided between the drain and the end of the packing casing communicating with the atmosphere. This may be accomplished by providing a portion of the surfaces engaging the spring means inclined towards the axis of the shaft. In the present instance I have shown the outer surfaces 26 of the segments being inclined towards the shaft and the saddle members being provided with twisted end portions 27 engaging the inclined surfaces of the segments. It will be readily understood that with such an arrangement the force exerted by the spring means on the individual segments has a component which causes a side thrust of the segments towards one partition of each cell whereby a fluid-tight seal between the cells and the segments is obtained. The packing rings are preferably arranged so that the artificial side thrust caused by the spring means takes place in the same direction as the natural side thrust caused by the pressure difference of the fluid and the atmosphere. The provision of means for causing an artificial side thrust on the packing rings is particularly important with those packing rings provided between the drain and the side of the packing casing communicating with the atmosphere, and it is equally important with the other packing rings in cases where small pressure difference exists between the fluid and the atmosphere.

With my invention I have accomplished a simple and reliable construction of a packing for preventing leakage along a shaft or like rotary member.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

In a packing arrangement, a casing having walls defining a cell, a rotary member projecting through the casing, a packing ring in the cell comprising a plurality of segments surrounding the rotary member, each segment having a portion with an outer surface inclined towards the shaft, a saddle member having a twisted portion engaging the inclined surface of the segment, and a leaf spring fastened to the saddle member and having portions engaging the inner surface of the casing.

In witness whereof I have hereunto set my hand.

DONALD F. WARNER.